United States Patent [19]

Matlock

[11] Patent Number: 5,555,753
[45] Date of Patent: Sep. 17, 1996

[54] VEHICULAR ANTI-THEFT STEERING WHEEL LOCK

[76] Inventor: Wayne Matlock, 1123 Wallace St., Malvern, Ark. 72104

[21] Appl. No.: 321,248

[22] Filed: Oct. 11, 1994

[51] Int. Cl.$^6$ .................................................. B60R 25/02
[52] U.S. Cl. ................................................ 70/209; 70/226
[58] Field of Search ........................... 70/207, 209, 211, 70/212, 225, 226, 237, 238

[56] References Cited

U.S. PATENT DOCUMENTS

| | | | |
|---|---|---|---|
| 1,154,389 | 9/1915 | Fogalsang | 70/209 |
| 1,395,532 | 11/1921 | Tilden . | |
| 1,421,401 | 7/1922 | Byers . | |
| 3,462,982 | 8/1969 | Moore | 70/209 |
| 3,815,391 | 6/1974 | Latta | 70/209 |
| 3,982,602 | 9/1976 | Gorman | 180/114 |
| 4,649,724 | 3/1987 | Raine | 70/225 X |
| 4,738,127 | 4/1988 | Johnson | 70/209 |
| 4,823,573 | 4/1989 | Latta | 70/209 |
| 4,856,308 | 8/1989 | Johnson | 70/209 |
| 4,935,047 | 6/1990 | Wu | 70/209 |
| 4,961,331 | 10/1990 | Winner | 70/209 |
| 5,007,259 | 4/1991 | Mellard | 70/209 |
| 5,024,069 | 6/1991 | Hull, Jr. et al. | 70/209 |
| 5,092,146 | 3/1992 | Wang | 70/209 |
| 5,142,889 | 9/1992 | Liu | 70/209 |
| 5,199,284 | 4/1993 | Lin | 70/209 |
| 5,239,849 | 8/1993 | Gallardo | 70/209 |
| 5,297,406 | 3/1994 | Lin | 70/209 |
| 5,381,679 | 1/1995 | Cummins | 70/209 |
| 5,415,018 | 5/1995 | Ferrante | 70/226 X |
| 5,454,240 | 10/1995 | Whitney | 70/167 X |

FOREIGN PATENT DOCUMENTS

WO92/04211  3/1992  WIPO .................................... 70/209

*Primary Examiner*—Lloyd A. Gall
*Attorney, Agent, or Firm*—Stephen D. Carver; Trent C. Keisling

[57] ABSTRACT

An anti-theft locking system surrounds and immobilizes vehicle steering wheels to immunize vehicles against theft and vandalism. The locking system preferably comprises a rigid, circular pan that surmounts the steering wheel and overlies the steering column. In this manner the vehicle air-bag compartment is protected. The pan has a rigid, peripheral rim that coaxially surrounds and ensconces the steering wheel ring. The steering wheel is thus rendered inaccessible to hack saws or cutting tools that are normally used by thieves to remove conventional steering wheel locks. An elongated locking assembly mounted on top of the pan is activated by a removable, elongated, rod that penetrates the locking assembly to fasten the pan on the steering wheel. The locking assembly is protected on top by a substantially tubular, protective shroud, and the lock bottom is protected by a compartment welded to the pan. A pair of hooks engage opposite sides of the steering wheel beneath the pan to snugly lock the pan to the wheel. Unless properly removed, the outwardly extending rod handle interferes with normal steering wheel control. When the locking system is locked upon the steering wheel, access to the air bag compartment is obstructed. Since the steering wheel cannot be contacted by cutting tool blades, it is rendered immune from cutting, and the protective hook mechanisms which grasp the steering wheel cannot be defeated.

18 Claims, 5 Drawing Sheets

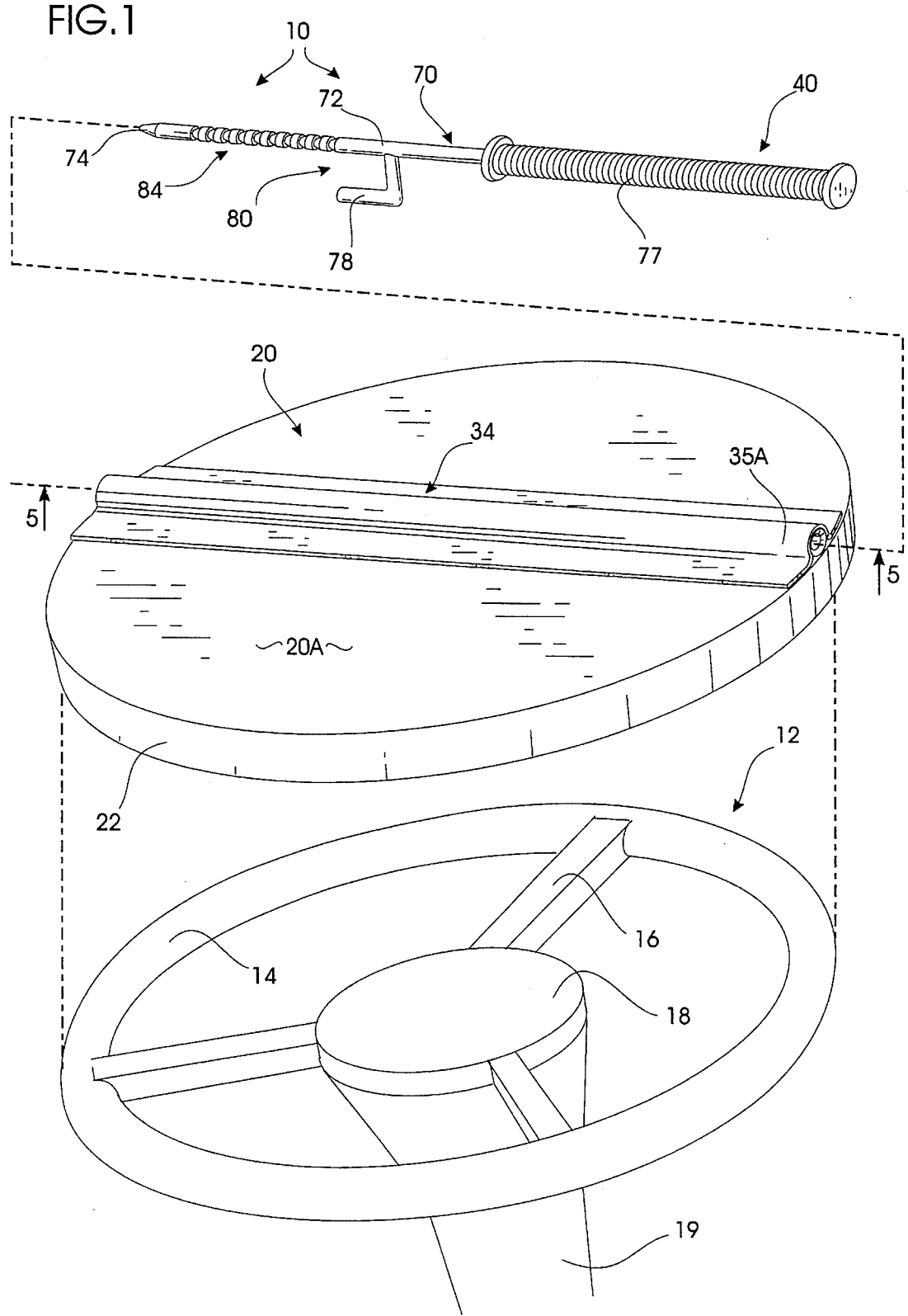

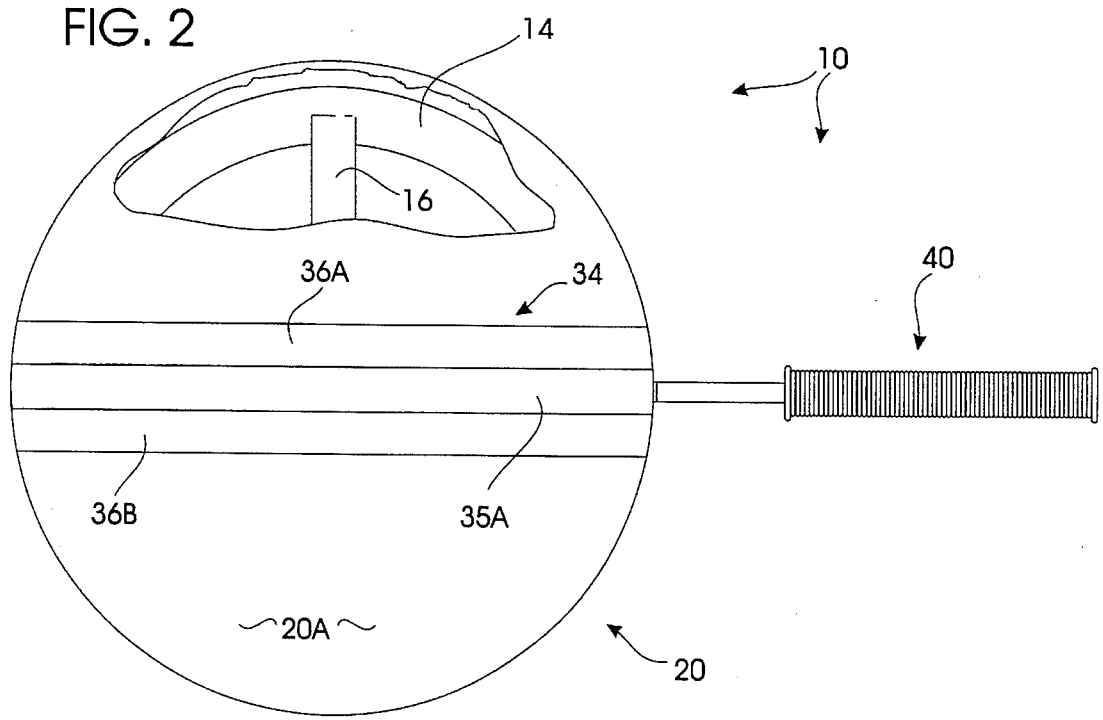
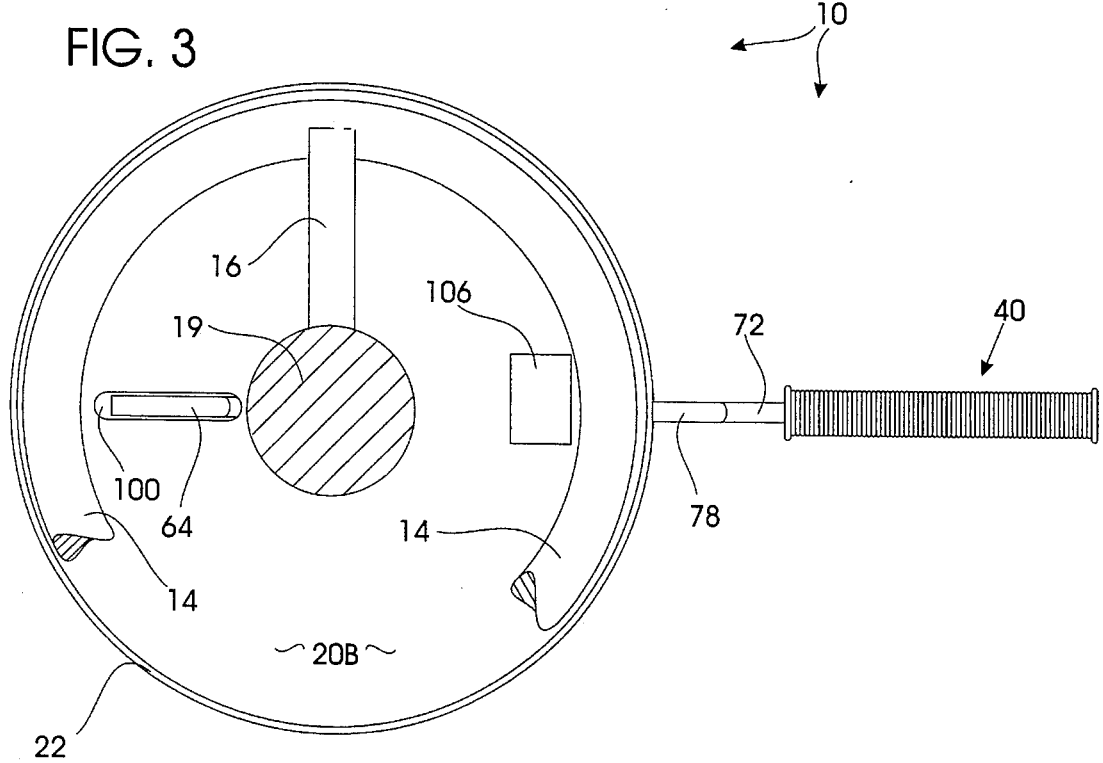

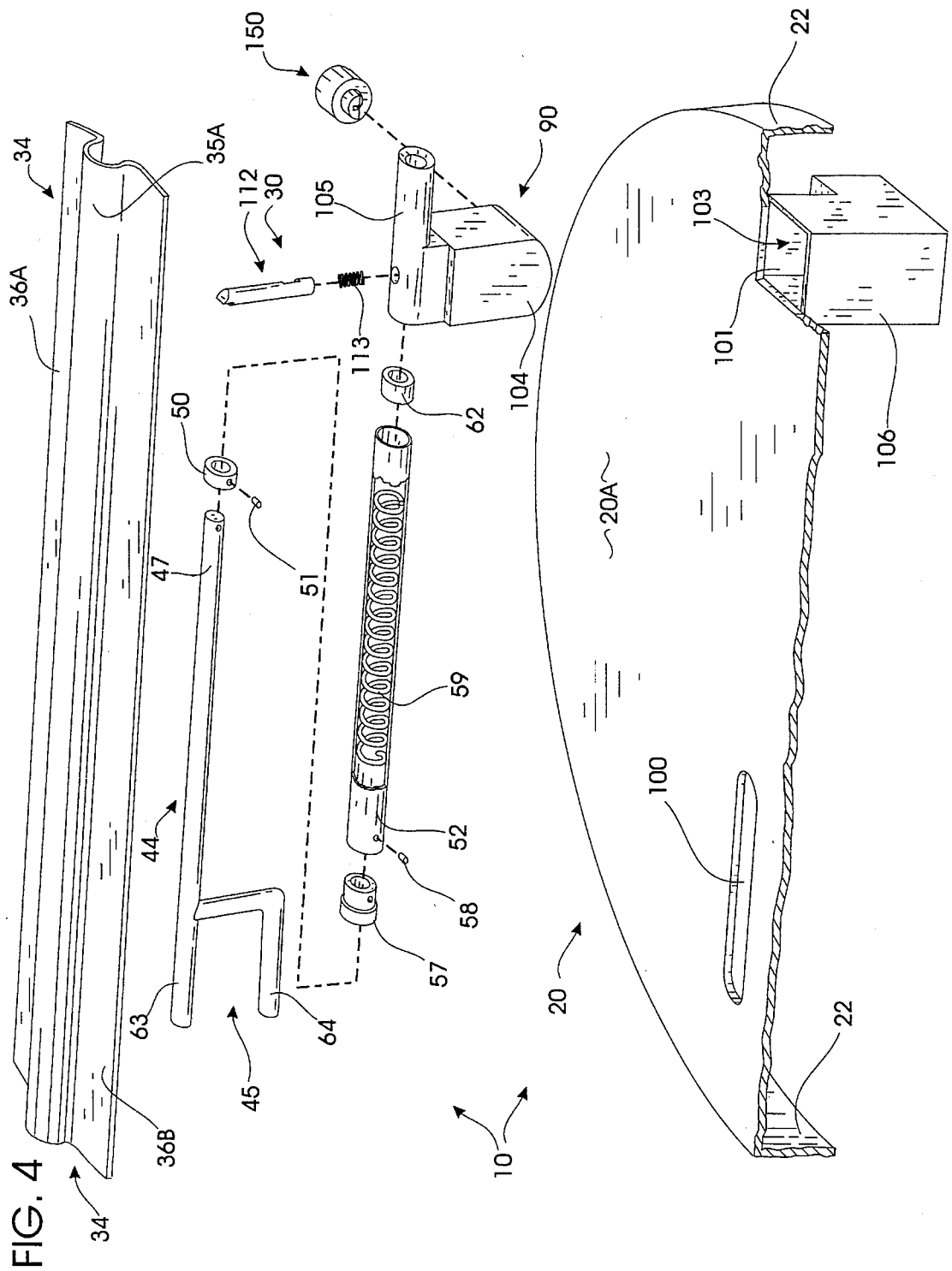

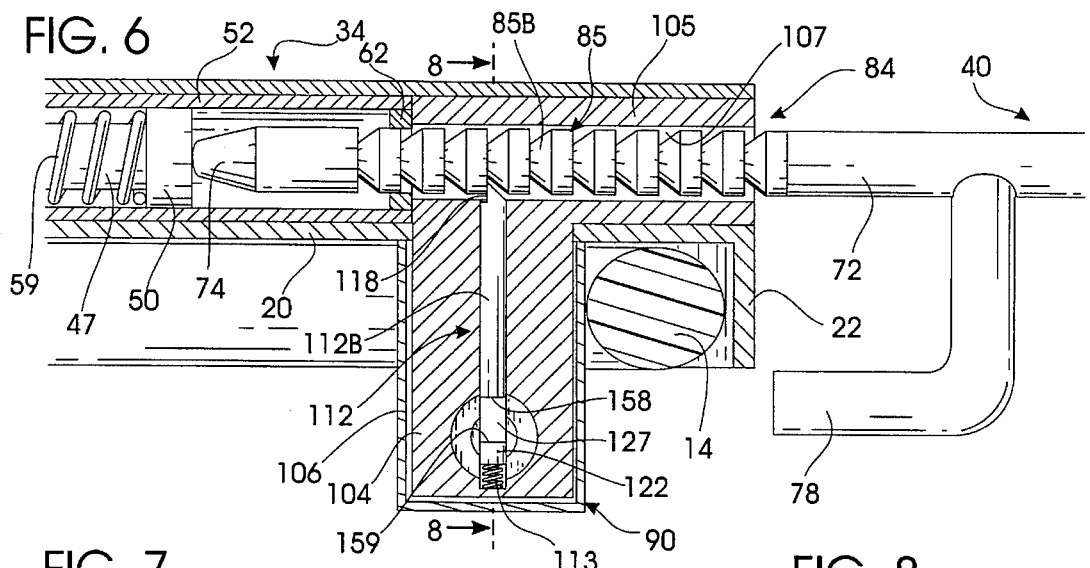
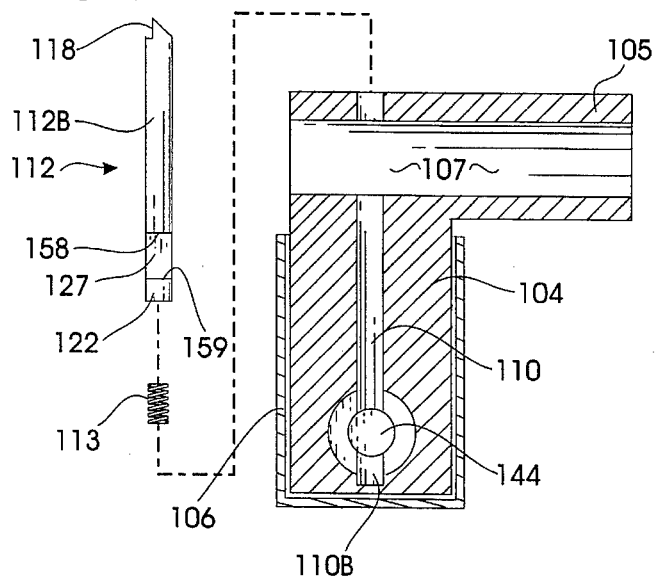
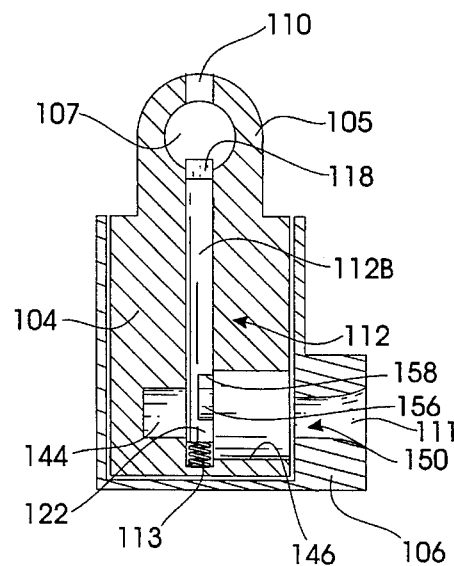
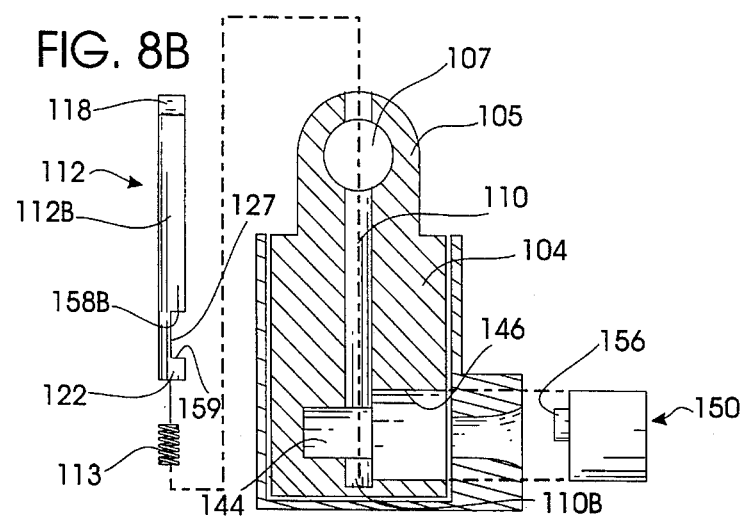

5,555,753

VEHICULAR ANTI-THEFT STEERING WHEEL LOCK

BACKGROUND OF THE INVENTION

I. Field of the Invention

This invention relates generally to accessory anti-theft devices for motor vehicle steering wheels. More particularly, the invention is directed to an anti-theft steering wheel cover lock system for obscuring access to the steering wheel. Prior art relevant to this case has been located by applicant in United States Class 70, Sub Classes 209 and 211, and United States Class 280, Sub Class 727.

II. Description of the Prior Art

In the prior art a substantial variety of anti-theft locking devices have been proposed that may be affixed to the steering wheel to deter theft of motor vehicles. Many different mechanical design concepts have been proposed in the past. The basic underlying principle is to mechanically prevent proper steering wheel control prior to authorized removal of the protective device. Typical prior art devices of this category affix to the steering wheel through extensible, elongated members terminating in forks or hooks which engage opposite sides of the steering wheel.

The steering wheel is prevented from turning properly unless the anti-theft device is first removed. When a thief jumps the ignition system or otherwise jimmies the conventional automotive ignition lock, he cannot control the vehicle properly because of mechanical interference by the locking device. The steering wheel cannot rotate properly because an elongated rod projecting from the anti-theft device radially contacts other objects within the car, making steering difficult, if not impossible.

A typical device is seen in U.S. Pat. No. 5,024,069 issued Jun. 18, 1991. This lock apparatus includes a pair of hooks controlled through a locking assembly to provide an extensible combination which locks and unlocks. When the hooks engage opposite portions of the steering wheel rim, an outwardly projecting member makes steering virtually impossible.

A similar device is seen in U.S. Pat. No. 5,239,849 issued Aug. 31, 1993. Again, transversely extending structure engages the steering wheel with a pair of hooks, and an outwardly extending member makes steering difficult because of mechanical interference.

U.S. Pat. Nos. 4,935,047, 4,856,308, and 4,738,127 relate to the very popular steering wheel sold under the registered trademark "THE CLUB." In this instance, a projecting hook on one rod member engages one side of the steering wheel, and an extensible rod member that telescopes to the hook portion includes a fork for engaging the opposite side of the steering wheel at a spaced apart distance. The central locking means is key activated, and allows the two members to obstruct steering unless the device is first removed. Removal is quick and easy if one merely saws through the steering wheel and manually bends the steering wheel ring.

U.S. Pat. No. 5,142,889 shows a similar apparatus wherein a hook and fork member are longitudinally extensible relative to one another, and may be locked in place upon the steering wheel to prevent proper steering.

U.S. Pat. No. 4,961,331, issued Oct. 9, 1990, provides a hook mechanism attached to an elongated member that attaches the steering wheel to the break pedal to lock the wheel against steering.

U.S. Pat. No. 3,982,602 provides a housing of generally conical dimensions that folds about the steering wheel to enclose the steering wheel and prevent thief access.

U.S. Pat. No. 5,007,259 includes a plurality of vertically upwardly extending members and horizontally outwardly extending members that lock upon the steering wheel to frustrate control of the wheel by a thief.

Older relatively heavier locking systems are seen in U.S. Pat. No. 4,823,573, 3,462,982, and 1,395,532. The latter Tilden Patent issued in 1921 shows a locking system wherein a plurality of chains and padlocks can be disposed over the steering wheel to provide a rather cumbersome locking arrangement.

Byers U.S. Pat. No. 1,421,401, patented Jul. 4, 1922, shows a cumbersome arrangement for locking a portion of the steering wheel to the steering column to interfere with rotational steering.

U.S. Pat. No. 3,815,391, issued Jun. 11, 1974, similarly includes a downwardly projecting chain element that interferes with steering and control.

There are a number of problems with known prior art devices. First, the basic problem with extensible forked or hooked rods which connect across the steering wheel is that they do not prevent the steering wheel from being attacked by the thief or vandal. A simple hacksaw can easily cut through the conventional plastic steering wheel, enabling subsequent deflection of the steering wheel ring to quickly remove these devices. In other words, these devices can be quickly removed by a thief who merely spends approximately one minute sawing through the steering wheel with a hacksaw in the appropriate place.

Another problem with known prior art devices is that they overly expose the center of the steering wheel column where the expensive and complex air bag protection apparatus is stored. When portions of the steering wheel are exposed to thievery, this expensive apparatus can be easily damaged or quickly stolen by thieves who have become aware of its value.

Hence, known prior art devices suffer from the primary failures of vulnerability to removal by hack sawing, and failure to cover the expensive air bag regions of the steering wheel.

SUMMARY OF THE INVENTION

My vehicular anti-theft steering wheel lock system covers and locks the vehicle steering wheel to reliably protect against thieves and vandals. Once fitted to and locked upon the steering wheel, the air bag compartment is blocked and cannot be entered. Most importantly, the steering wheel ring cannot be contacted by a hack saw so it is immune from cutting. Thus my locking device cannot be quickly removed by conventional sawing or prying techniques, and it substantially slows down even professional car thieves.

My locking device comprises a large circular pan that covers the entire steering wheel. The rigid, preferably steel pan includes a round center section that completely blocks the steering column. The air-bag compartment is thus protected. A rigid, peripheral rim covers the steering wheel ring. Since the downwardly depending rim completely blocks the steering wheel ring, it is inaccessible to the saws or cutting tools of thieves or vandals.

An elongated locking assembly is mounted on top of the pan. It is activated by a removable, elongated, rod that penetrates the locking assembly to fasten the pan on the steering wheel. The locking assembly is protectively covered by an elongated, protective shroud.

The locking assembly comprises a first hook that has a forked end for engaging one side of the steering wheel beneath the protective pan. It is slidably received within an elongated, rigid sleeve beneath the protective shroud. A compression spring normally biases the first hook to a rest position.

The removable rod has a hook that cooperates to grasp the steering wheel. A forward end and the hook are controlled by a remote handle grip portion. The outwardly extending rod handle projects away from the steering wheel to interfere with steering wheel control. A toothed, ratchet region formed on the rod is engaged by a lock projecting beneath the pan. Both hooking mechanisms grasp the steering wheel once the rod is inserted into the locking mechanism.

The lock comprises a body that extends downwardly through a pan orifice. The lock has an upper, transversely extending tube penetrated by the rod. A tubular passageway perpendicularly defined within the lock body receives an elongated locking pin that is normally biased into engagement toward the rod ratchet region. A key activated dog disposed within a suitable bore controls locking pin deflection. When it is necessary to remove the device, the key rotates the dog to deflect the locking pin downwardly and free the apparatus.

Thus a primary object of the present invention is to protect a vehicle steering wheel from thieves and vandals.

A more fundamental object is to provide an extremely reliable theft deterrent for vehicles.

It is another object of this invention to provide fail-safe protection for the steering wheel of a vehicle to maximally protect it against sawing or destruction by a vandal or thief.

Another object is to provide a steering wheel guard system that prevents the steering wheel from being harmed.

Another object is to provide an anti-theft protection device for automobiles that is extremely resistant to unauthorized removal or tampering.

A further abject is to provide a highly visible thief deterrent system that will be plainly seen by potential thieves and which will thus be avoided by them.

Another object of my invention is to provide an anti-theft steering protection system of the character described that prevents thieves from getting at the air bags associated with newer model vehicles.

A still further object of my protective system is to provide a theft deterrent system of the character described that can be adapted for use with a wide variety of steering wheel sizes and shapes.

Another object is to provide a locking device of the character described that absolutely prohibits access to the steering wheel ring so that no one can saw or damage it.

Another fundamental object is to provide a vehicle locking system of the character described that completely covers the air bag region of the steering shaft, to prevent theft or inadvertent detonation of same by thieves or vandals.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is an exploded isometric view of the best mode of my steering wheel lock, showing how it attaches to a steering wheel;

FIG. 2 is a fragmentary top plan view of my steering wheel lock, showing it installed;

FIG. 3 is a fragmentary, bottom plan view of the apparatus installed upon a conventional steering wheel, with portions thereof broken away or shown in section for clarity;

FIG. 4 is an enlarged, fragmentary exploded view;

FIG. 6 is a further enlarged, fragmentary sectional view of the rightmost portion of FIG. 5, FIG. 7 is an enlarged, fragmentary sectional and partially exploded view of the lock;

FIG. 8 is a fragmentary sectional view taken generally along line 8—8 of FIG. 6; and FIG. 8b is a fragmentary sectional view similar to FIG. 8, but with the locking pin and spring exploded from the assembly for clarity.

DETAILED DESCRIPTION OF THE DRAWINGS

Figure 5:
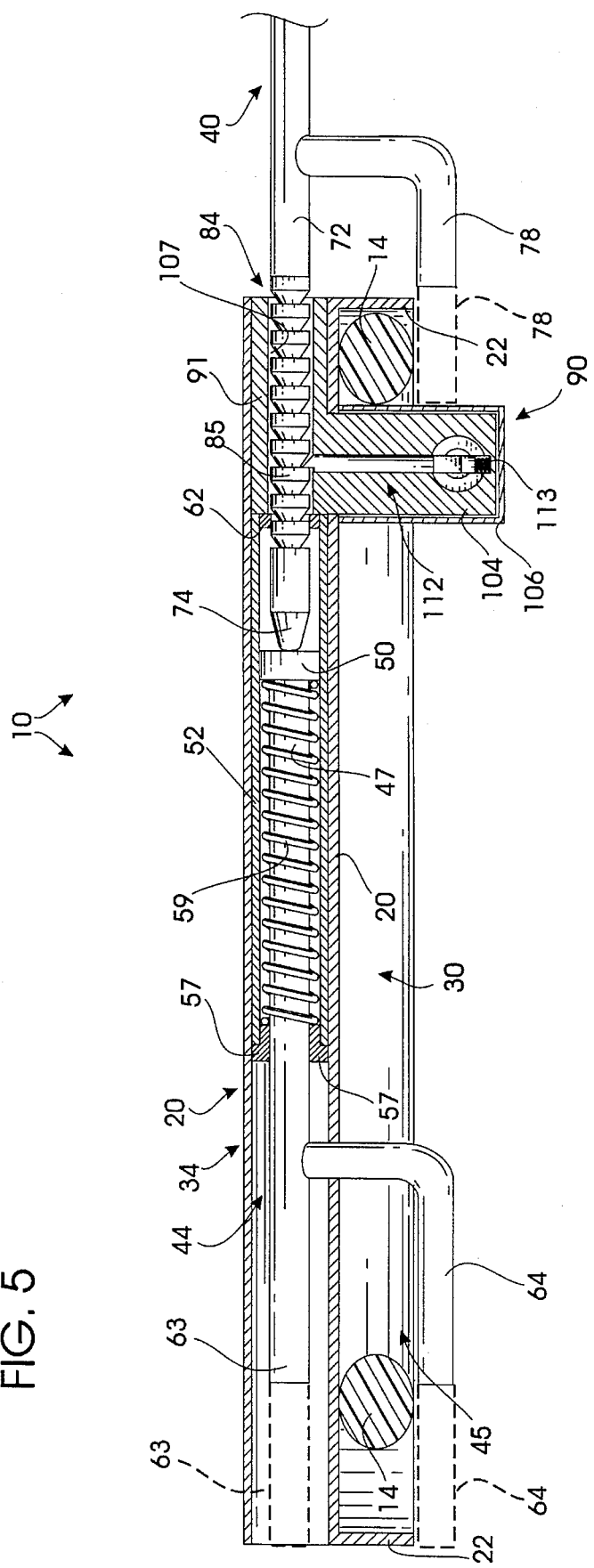
FIG. 5 is an enlarged, fragmentary sectional view taken generally along line 5—5 of FIG. 1 showing the locking assembly, the lock, and the locking bar, with moved positions indicated in dash lines.

With initial reference now directed to FIGS. 1–4 of the appended drawings, my Vehicular Anti-theft Steering Wheel Lock has been generally indicated by the reference numeral 10. The device is adapted to be installed upon a conventional steering wheel 12 (FIG. 1) of a vehicle to be protected by the device. Once the device is installed as hereinafter described, the steering wheel 12 will be protected and the device cannot be quickly removed by conventional sawing. Furthermore the air bag will be protected as well.

Turning to FIG. 1, the conventional steering wheel 12 includes a rigid, plastic circular ring 14 connected by spokes 16 to steering column 19. As will be recognized by those skilled in the art, the air bag apparatus of modern vehicles is stored within an upper compartment 18 of the steering column 19 so it is important to protect that region against tampering by theft or vandals. Further, it will be appreciated that the steering ring portion 14 may be quickly split apart by sawing it with a hacksaw, so more conventional anti-theft locking accessories may be easily defeated.

Device 10 preferably comprises a rigid, circular pan generally designated by the reference numeral 20 disposed over the steering wheel 12. Pan 20 includes an integral, peripheral, downwardly projecting rim 22. As best viewed in FIG. 3, rim 22 coaxially encircles the steering wheel ring 14 and completely covers it, rendering it inaccessible to thieves or vandals.

A locking assembly, generally designated by the reference numeral 30 (FIG. 4), is substantially disposed on the top 20A of pan 20 beneath an elongated, protective shroud 34. Shroud 34 includes a generally tubular elongated center 35A which is integral with a pair of outwardly extending, aligned and parallel flat flanges 36A and 36B (FIG. 2) respectively. It is selectively engaged by an elongated, rod-like handle 40 (FIG. 1) to activate the device and lock the cover pan 20 upon the steering wheel.

With reference now directed to FIGS. 4–8B, the locking assembly 30 comprises a first hook mechanism, generally designated by the reference numeral 44, that has a forked end 45 emanating from a rigid cylindrical shaft 47. Mechanism 44 is normally slidably received within an elongated, rigid sleeve 52. Shaft 47 terminates in a bushing 50 that is coaxially disposed within the shroud 34. Bushing 50 is attached to shaft 47 by a pin 51 (FIG. 4). Sleeve 52 receives an internal stop 57 that is coaxially disposed within the tubular portion 35A of the covering shroud 34. Stop 57 is fastened by a pin 58. An elongated compression spring 59 is coaxially disposed about the hooking member 44 within sleeve 52 to normally bias bushing 50 towards the right (as viewed in FIGS. 5, 6). Thus the forked end 45 will normally be pushed to the right, towards the opposite terminal ring 62 that can prevent bushing 50 from escaping.

Forked hook end 45 is thus normally biased out of engagement with the steering wheel ring 14. However, as indicated in dash lines in FIG. 5, the hooking member 44 can be displaced to the left so the forked end 45 captivates the steering wheel ring 14. At this time the elongated end 63, that is parallel with the hooked portion 64, will overlie the top and bottom of the steering wheel. As best viewed in FIG. 4, when the hook mechanism 44 is fitted beneath the shroud 34, the lower and forward projecting hook portion 64 of the forked end 45 will clear through an elongated follower slot 100 defined in the top of the pan 20. The spaced apart orifice 101 receives the downwardly projecting lock 90, which enters a protective compartment 103 formed by cover 106. The cover 106 is generally cubicle, and is welded to the underside 20B of pan 20. As best viewed in FIG. 5, the pan rim 22 will prevent access to the steering wheel ring 14 so it cannot be sawed with a hacksaw or the like.

The locking assembly 30 also comprises a second rod-like, hooking mechanism 40. Hook 40 comprises an elongated body, generally designated by the reference numeral 70, that includes a rigid, cylindrical, rod portion 72 terminating in a tipped end 74 that is spaced apart from the handle grip portion 77. The outwardly projecting handle grip 77 projects away from the steering wheel and will interfere and contact the inside of the car.

In other words, if the steering wheel is turned too far to the left or right without first removing device 10, the handle can collide with the interior dashboard, windshield, or seat of the vehicle preventing proper control. Also, the pan will cover air bag compartment 18 at this time, protecting the air bag apparatus from damage and theft.

Hook portion 70 comprises a lower forked area 80 including a downwardly projecting hook 78 that is parallel with the body 72. Between the hook portion 78 and the front tapered tip 74 is a segmented ratchet region 84. The ratchet region includes a plurality of integral, spaced apart coned sections 85 that include tapered segments 85B engaged by the lock to be hereinafter described. By grasping handle 77, the second locking member 40 may be appropriately manipulated, so that point 74 and the ratchet region 84 slide into the lock 90 to be later described. As point 74 enters the tubular portion 91 of lock 90, it will transfer through terminal ring 62, entering sleeve 52 and contacting bushing 50 to deploy the hook mechanism 44 to the left. As the second hook member 40 is deflected leftwardly, hook mechanism 44 will assume the position indicated in dashed lines in FIG. 5 and lock over the steering wheel. Concurrently, hook portion 78 will assume the position indicated in dashed lines and lock against the opposite side of the steering wheel 14. Again, the steering wheel ring 14 (FIG. 5) will be totally shrouded by pan rim 22.

Lock 90 (FIGS. 6–8B) comprises a substantially vertically oriented body 104 that extends downwardly through orifice 101 (FIG. 4) in the pan 20. Body 104 is integral with an upper, transversely extending tube 105 that has an elongated, tubular passageway 107 penetrated by hooking member 40 when the apparatus is assembled. A separate, elongated, tubular passageway 110 is defined substantially through the middle interior of vertical body 104, and is perpendicular or normal to passageway 107, extending all the way through tubular portion 105. An elongated locking pin 112 is biased by a compression spring 113 (FIGS. 7, 8B) within passageway 110. Spring 113 is captivated within passageway segment 110B and normally biases the locking pin 112 upwardly (as viewed in FIG. 6). When this pin 112 is biased upwardly, its notched tip 118 is forced into engagement with a cone section 85 of the ratchet region previously described.

Pin 112 includes a lowermost portion 122 that is physically contacted by spring 113 to bias tip 118 into contact with the ratchet assembly 84 previously described. Between end 122 and the main shank portion 112B of the pin 112 is a flat 127. Flat 127 is normally disposed within the passageway 110 with its face facing to the right (as viewed in FIG. 8B).

A bore 144 is coaxial with a larger-diameter coaxial counterbore 146 defined in the bottom of the lock body 104. Bore 144 is coaxially aligned with bore 146. Bores 144 and 146 are perpendicular both to vertical passageway 110 and the upper, transverse passageway 107. In assembly these bores are coaxially aligned with passageway 111 (FIG. 8B) defined in cover 106 previously described. Bore 146 receives a tubular dog generally designated by reference numeral 150 (FIGS. 7–8B, 4) that is rotatably fitted into bore 146. This tubular, key activated dog 150 includes a semicircular, rearwardly projecting stem 156. The semi-circular projection 156 mates against flat 127 in pin 112. Since the projection 156 is off center from dog 150, rotation thereof may deflect pin ledges 158 and 159 on opposite sides of the flat 127.

Normally spring 113 will bias the locking pin upwardly where it is eager to contact the ratcheting assembly. The ratcheting assembly may be forced against it, because the sliding action of the tapered tip 118 against the cone members 85 will allow one way mechanical passage of the ratchet assembly as it is moving to 28 the left (as viewed in FIG. 6). However, it may not be withdrawn (i.e., by movement to the right as viewed in FIG. 6) because the tip 118 will firmly engage the cylindrical end of each cone 85.

When necessary to unlock the device, a key is inserted into the dog 150, traversing passageway 111 of cover 106. It is thereafter rotated so that off center projection 156, that bears against the ledges 158, 159 (FIGS. 8B, 7) will deflect the locking pin 112 downwardly. In other words, as the projection 156 is rotated, it will contact ledge 159, pulling the pin 112 down within passageway 110 against yieldable bias from spring 113. As the pin end 118 is lowered from within tubular passageway 107, and thus escapes mechanical contact with the ratchet cones 85, the hooking member 40 may be withdrawn from the apparatus, for removal from the steering wheel prior to operation of the motor vehicle in the normal manner.

From the foregoing, it will be seen that this invention is one well adapted to obtain all the ends and objects herein set forth, together with other advantages that are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vehicular anti-theft steering wheel locking device comprising:

a rigid, generally circular pan for substantially covering the steering wheel of a vehicle to be protected, the pan comprising a peripheral, downwardly projecting rim for preventing a thief or vandal from sawing through the steering wheel;

a locking assembly coupled to said pan, said locking assembly comprising:

a first hook for selectively engaging at least a portion of the steering wheel when the pan is deployed upon the steering wheel;

a second hook for engaging an opposite portion of the steering wheel when said device is installed, said second hook having an elongated outwardly projecting portion that prevents normal operation of the vehicle unless the device is first removed;

a lock projecting beneath said pan for locking said first and second hooks in engagement with said steering wheel; and, an elongated, rigid shroud secured to a top of said pan for protecting said locking assembly.

2. The anti-theft device as defined in claim 1 wherein said first hook comprises at least a portion projecting downwardly through a follower slot defined in said pan.

3. The anti-theft device as defined in claim 2 wherein said lock projects downwardly through an orifice defined in said pan that is spaced apart from said follower slot.

4. The anti-theft device as defined in claim 1 wherein:

said locking assembly comprises an elongated, rigid sleeve disposed beneath said shroud;

said first hook is coaxially telescoped to said sleeve and axially displaceable with respect thereto; and, said second hook comprises a ratchet portion inserted through said lock and into said sleeve to activate said first hook, said ratchet portion engaged by said lock to secure said device.

5. The anti-theft device as defined in claim 4 wherein said lock comprises:

a rigid body that projects downwardly through said pan;

a tubular portion for coaxially receiving said ratchet portion, said tubular portion coaxially aligned with said sleeve beneath said shroud; and, cover means for protecting the lock from attack.

6. The anti-theft device as defined in claim 5 wherein said lock further comprises:

an elongated interior passageway normal to said tubular portion;

an elongated locking pin coaxially disposed within said passageway; and, means for normally biasing said locking pin into engagement with said ratchet portion to prevent withdrawal of said second hook from said device.

7. The anti-theft device as defined in claim 6 wherein said lock comprises key activated dog means for controlling said pin, wherein said dog means is rotatably confined within a compartment normal to said interior passageway and spaced apart from said tubular portion.

8. The anti-theft device as defined in claim 7 wherein said dog means comprises a semicircular projection extending interiorly of said compartment, and said pin comprises a ledge selectively engaged by said projection to deflect said pin away from said ratchet portion when the device is unlocked.

9. A vehicular anti-theft device comprising:

a rigid, generally circular pan for substantially covering the steering wheel of a vehicle to be protected, the pan comprising a peripheral, downwardly projecting rim for preventing a thief or vandal from sawing through the steering wheel;

a locking assembly coupled to said pan, said locking assembly comprising:

a rigid, elongated sleeve;

an extensible hook coaxially telescoped to said sleeve for engaging at least a portion of the steering wheel beneath the pan when deployed;

a removable, cooperating rod adapted to be inserted within said sleeve to activate said device, said rod comprising a hook portion for engaging a portion of the steering wheel when said device is installed and an outwardly projecting handle that interferes with normal operation of the steering wheel unless the device is first removed;

a lock projecting beneath said pan for locking said rod in engagement within said sleeve when said device is deployed; and, an elongated, rigid, shroud secured to said pan for protecting said locking assembly, said shroud comprising a substantially tubular portion longitudinally aligned with and covering said elongated sleeve.

10. The anti-theft device as defined in claim 9:

wherein the locking assembly and the shroud are mounted on top of said pan; and, said extensible hook projects downwardly through a follower slot defined in said pan.

11. The anti-theft device as defined in claim 10 wherein said lock projects downwardly through an orifice defined in said pan that is spaced apart from said follower slot.

12. The anti-theft device as defined in claim 11 wherein said removable rod comprises an elongated, rigid body terminating at one end in a point for coaxially contacting said hook within said sleeve, and a ratchet portion defined on said rod between said point and said hook portion that is engaged by said lock.

13. The anti-theft device as defined in claim 12 wherein said lock comprises:

a rigid body that projects downwardly through said orifice;

a tubular portion adapted to receive said rod, said tubular portion coaxially aligned with said sleeve beneath said shroud;

an elongated interior passageway normal to said tubular portion;

an elongated locking pin coaxially disposed within said passageway;

means for normally biasing said pin into locking engagement with said rod ratchet portion; and, a cover for preventing damage to the lock.

14. The anti-theft device as defined in claim 13 wherein said lock comprises key activated dog means for controlling said locking pin, wherein said dog means is rotatably confined within a compartment normal to said interior passageway and spaced apart from said tubular portion.

15. The anti-theft device as defined in claim 14 wherein said dog means comprises a semicircular projection extending interiorly of said compartment, and said pin comprises a ledge selectively engaged by said projection to deflect said pin away from said ratchet portion when the device is unlocked.

16. A circular, vehicular anti-theft device that substantially enshrouds a steering wheel when installed, said device comprising:

a rigid, generally circular pan for substantially covering the steering wheel of a vehicle to be protected, the pan comprising a top, an underside, and an integral, peripheral, downwardly projecting rim for surrounding the steering wheel for preventing a thief or vandal from sawing through the steering wheel;

a locking assembly comprising:

a rigid, elongated sleeve;

an extensible hook coaxially telescoped to said sleeve for engaging at least a portion of the steering wheel beneath the pan when deployed;

a removable, cooperating rod adapted to be inserted within said sleeve to activate said device, said rod comprising a hook portion for engaging a portion of the steering wheel when said device is installed and an outwardly projecting handle that interferes with normal operation of the steering wheel unless the device is first removed;

a lock projecting beneath said pan for locking said rod in engagement within said sleeve when said device is deployed; and, a cover attached to the underside of said pan for protecting said lock; and, an elongated, rigid, shroud secured on top of said pan for protecting said locking assembly, said shroud comprising a substantially tubular portion longitudinally aligned with and covering said elongated sleeve.

17. The anti-theft device as defined in claim 16 wherein the pan comprises a follower slot for receiving said extensible hook and an orifice through which said lock projects downwardly into a protective compartment formed by said cover.

18. The anti-theft device as defined in claim 17 wherein said lock comprises:

a tubular portion that receives said rod, said tubular portion coaxially aligned with said sleeve beneath said shroud;

an elongated interior passageway normal to said tubular portion;

an elongated locking pin coaxially disposed within said passageway;

means for normally biasing said pin into locking engagement with said inserted rod; and, key activated dog means for controlling said locking pin, wherein said dog means is rotatably confined within a compartment normal to said interior passageway and spaced apart from said tubular portion, wherein said dog means comprises a semicircular projection extending interiorly of said compartment, and said pin comprises a ledge selectively engaged by said projection to deflect said pin away from said inserted rod when the device is unlocked.

* * * * *